Patented Dec. 5, 1933

1,937,914

UNITED STATES PATENT OFFICE 1,937,914

TREATMENT OF HYDROCARBON OILS

Herman Pines, Chicago, Ill., assignor to Universal Oil Products Company, Chicago, Ill., a corporation of South Dakota No Drawing. Application December 1, 1930
Serial No. 499,418

2 Claims. (Cl. 196—27)

This invention relates to the treatment of hydrocarbon oils, and refers more particularly to the refining of hydrocarbon oil distillates, especially those resulting from the cracking or pyrolysis of higher boiling hydrocarbons. Hydrocarbon oil distillates, depending upon the source, contain undesirable compounds which must be removed by refining processes. This is especially true of cracked hydrocarbon oil distillates containing highly unsaturated hydrocarbons which produce gums, resins and tars and other undesirable materials which not only tend to discolor the gasoline, but also interfere with its use. In addition, hydrocarbon distillates, especially those of the cracked type, may contain, depending upon the source, relatively large amounts or high percentages of sulphur compounds which affect the quality of the gasoline or other distillate products, and may result in corrosion of the motor when the gasoline is used.

It is among the objects of the present invention to provide a process for the refining of such hydrocarbon distillates and specifically for the removal of the objectionable sulphur compounds contained therein.

In its specific embodiment the invention comprises the treatment of hydrocarbon oils with sodamide ($NaNH_2$). Preferably the sodamide is in a molten state during the treatment. The melting point of sodamide is approximately 412° F. and it has been found desirable to treat the oil at this temperature or above. In applying the invention to practice, the oil to be treated is preferably vaporized and bubbled through, or otherwise contacted with the molten sodamide.

While I have not investigated the reactions which occur during the treatment of hydrocarbon distillates with sodamide ($NaNH_2$) it is reasonably certain that the sulphur compounds obtained in the oil distillate react with the sodamide to produce sodium sulphide as one of the end products, which being immiscible with the oil is removed therefrom.

It is within the scope of my invention to employ individual compounds which are used to make sodamide, namely, sodium and ammonia, in which case the oil vapors are passed through sodium while simultaneously bubbling ammonia therethrough; although it has been found more convenient to manufacture the sodamide first and then employ it thereafter in the treatment of the oils.

To illustrate the method of applying my invention, the distillate to be treated is introduced into a suitable still and vaporized. The vapors are led through a vessel containing the molten sodamide. The vapors emerging from the sodamide may be condensed and then subjected to redistillation, preferably in the presence of steam. Contact between the oil vapors and sodamide may be promoted by any suitable means, such as a stirring device, or by causing the vapors to flow counter-current to a stream of sodamide with suitable contacting materials such as Raschig rings, pipe nipples, rock or gravel filling, grids, or the like. Special contacting devices such as a bubble tower may be used in which case the sodamide is maintained in a molten state upon a deck and the vapors caused to bubble therethrough.

I have found in the practice of my invention that combination treatments employing the sodamide treatment as one step in the refining process have proven especially effective. For example, when the distillate is subjected to treatment with sulphuric acid and properly neutralized after removal of the sludge, and is then subsequently treated with sodamide, a different result is obtained than by treatment with sodamide alone, and similarly when the sodamide treated product is subjected to sulphuric acid treatment still another result is obtained; hence, it is within the scope of my invention to employ the sodamide treatment as a step in the refining process in combination with other treatments generally well known to the refining art, but which in combination with sodamide treatment produces a novel and unexpected result.

In order to illustrate my invention specific examples of the treatment of a cracked distillate will be given showing the use of sodamide as a sole treating agent and in various combinations with sulphuric acid treatment. The tests were made by passing oil vapors through molten $NaNH_2$. The temperatures of the reaction are arbitrarily selected as 500–510° F., although other suitable temperatures could be employed. The rate of the flow of oil in these specific tests was such as to maintain only a very short time of contact with the molten sodamide, and it is to be recognized that as the time of contact is increased the results are improved within certain limits. The oil undergoing treatment was a California cracked distillate containing 0.56% sulphur and having a gum content of 325 mgs.

per 100 ccs. The results obtained are given in the following table:

| | Engler Dist. | | | Percent sulphur | Gums mg. per 100 cc. | Anti-knock benzol value | Color Saybolt colorimeter |
|---|---|---|---|---|---|---|---|
| | I.B.P. | 50% | E.P. | | | | |
| Original oil | 113 | 285 | 435 | .56 | 325 | ---- | Very bad. |
| Blank | 120 | 290 | 446 | .53 | 679 | 55 | Very bad. 25. |
| NaNH₂ | 132 | 290 | 434 | .23 | 635 | 53 | Exposed. 21. |
| Original oil steam distilled | 110 | 272 | 410 | .52 | 336 | ---- | Bad. |
| NaNH₂ followed by steam | 132 | 284 | 412 | .21 | 594 | ---- | −30 exposed 30 |
| Original oil 10 # H₂SO₄ at 70° F | 124 | 282 | 412 | .30 | 57 | ---- | |
| NaNH₂ followed by 10# H₂SO₄ at 70° F | 132 | 294 | 412 | .09 | 344 | ---- | −30 |
| 10# H₂SO₄ followed by NaNH₂ | 130 | 286 | 410 | .12 | 412 | ---- | −30 |
| 10# H₂SO₄ NaNH₂ steam distilled | 128 | 284 | 390 | .11 | 29 | ---- | Excellent −30 |

The examples given are purely illustrative of the broad scope of my invention, which is applicable to a wide range of treating conditions, to many combinations of treating steps and to a great variety of oils.

By the term "anhydrous", as used in the claims, is meant a hydrocarbon oil or vapor free from objectionable amounts of water, i. e. water in sufficient amount to convert substantial amounts of sodamide and/or to cause explosions.

I claim as my invention:

1. A process for desulphurizing hydrocarbon oil which comprises contacting the same in vapor phase and in substantially anhydrous condition with sodamide.

2. A process for desulphurizing hydrocarbon vapors which comprises passing the same while in substantially anhydrous condition through molten sodamide.

HERMAN PINES.